United States Patent
Takayanagi

(10) Patent No.: US 10,759,570 B2
(45) Date of Patent: Sep. 1, 2020

(54) TANK CAP

(71) Applicant: MAKITA CORPORATION, Anjo-shi, Aichi (JP)

(72) Inventor: Yoshiaki Takayanagi, Anjo (JP)

(73) Assignee: MAKITA CORPORATION, Anjo-shi, Aichi (JP)

( * ) Notice: Subject to any disclaimer, the term of this patent is extended or adjusted under 35 U.S.C. 154(b) by 55 days.

(21) Appl. No.: 16/131,422

(22) Filed: Sep. 14, 2018

(65) Prior Publication Data
US 2019/0100358 A1 Apr. 4, 2019

(30) Foreign Application Priority Data
Sep. 29, 2017 (JP) ................. 2017-191097

(51) Int. Cl.
*B65D 41/04* (2006.01)
*B60K 15/00* (2006.01)
*B60K 15/04* (2006.01)

(52) U.S. Cl.
CPC .......... *B65D 41/0485* (2013.01); *B60K 15/00* (2013.01); *B65D 41/0442* (2013.01); *B60K 15/0406* (2013.01); *B60K 2015/0438* (2013.01); *B60K 2015/0451* (2013.01); *B60K 2015/0496* (2013.01)

(58) Field of Classification Search
CPC ............ B65D 41/0485; B65D 41/0442; B65D 43/26; B60K 15/00; B60K 2015/0451; B60K 2015/0496; B60K 2015/0438; B60K 15/0406

USPC ...................... 220/212.5, 303, 304
See application file for complete search history.

(56) References Cited

U.S. PATENT DOCUMENTS

| | | | | |
|---|---|---|---|---|
| 5,385,256 A | * | 1/1995 | Brown | B60K 15/04 220/315 |
| 2007/0090113 A1 | * | 4/2007 | Otsuka | B60K 15/0406 220/304 |
| 2012/0318797 A1 | * | 12/2012 | Martinsson | B60K 15/0405 220/212.5 |
| 2014/0367384 A1 | * | 12/2014 | Betzen | B60K 15/0406 220/285 |

FOREIGN PATENT DOCUMENTS

JP    2015-226980 A    12/2015

* cited by examiner

*Primary Examiner* — James N Smalley
(74) *Attorney, Agent, or Firm* — Sughrue Mion, PLLC

(57) ABSTRACT

The present invention relates to a tank cap including a lever member that is constrained from moving to the standing position contrary to the intention of the operator. The tank cap comprises a slide member disposed in the cap body so as to be adjacent to the lever member, and provided with a cam contact portion that is to come into contact with a cam portion of the lever member, and a coil spring disposed between the slide member and the bottom of the cap body. The resilience of the coil spring causes the cam contact portion to press the cam portion and retains the retracted position.

10 Claims, 10 Drawing Sheets

TANK CAP

CROSS-REFERENCE TO RELATED APPLICATION

The application claims priority from Japanese Patent Application No. 2017-191097 filed on Sep. 29, 2017, the entire contents of which are incorporated herein by reference.

BACKGROUND OF THE INVENTION

Field of the Invention

The present invention relates to a tank cap attached to a filler port of a tank.

Description of Related Art

A portable hand-held tool such as a chainsaw is driven by electricity or an internal combustion engine. Examples of the hand-held tool include hedge trimmers, grass trimmers, and mowers, in addition to chainsaws. For example, as shown in FIG. 12, a chainsaw 100 driven by an internal combustion engine includes a fuel tank 101, a lubricating oil tank 102, and the like. These tanks 101, 102 are provided with filler ports. Tank caps 103, 104 are attached to the filler ports so that they can be opened and closed.

In order to prevent the liquid in the tank from leaking out, each tank cap 103, 104 tends to be fastened tightly so as to seal the filler port. Thus, in preparing to refill liquid into the tanks, the operator may experience difficulty opening the tank caps 103, 104. Known structures that facilitate the opening and closing of the tank caps 103, 104 include finger grip portions 103a, 104a protruding from the head of the tank caps 103, 104, respectively, as shown in FIG. 12. It is preferable that the tank caps 103, 104 require less effort for the operator to attach or detach (close or open) them when the operator refills liquid into the tanks. For this reason, the protruding finger grip portions have to be sufficiently large.

However, these protruding finger grip portions 103a, 104a may catch on operator's work clothes or the like and/or may impact another structure and break while the operator is operating the chainsaw 100. The larger the finger grip portions 103a, 104a are, the higher the risk of such catching and impacting another structure is. In other words, providing the finger grip portions 103a, 104a for facilitating the opening of the tank caps 103, 104 may, in turn, reduce the efficiency of work using the chainsaw 100.

In a known structure that addresses such a problem, a retractable grip portion is provided on the head of the tank cap as, for example, disclosed in JP 2015-226980 A. In this example, the grip portion is pivotable about the pivot shaft and movable to the standing position from the retracted position in which the grip portion is pushed over sideways.

To attach or detach the tank cap, the operator first moves the grip portion to the standing position, then grasps the grip portion, and turns the tank cap. Thus, this structure facilitates the opening of the tightly fastened tank cap, like the structure including the finger grip portion as shown in FIG. 12. Furthermore, using the tank cap as disclosed in JP 2015-226980 A allows the operator to work using the chainsaw with the grip portion set in the retracted position, and thus may reduce the risk of catching on something in the above manner during such work.

In one example of the pivot mechanism provided in the tank cap disclosed in JP 2015-226980 A, a torsion spring is attached to the pivot shaft, and the resilience of the torsion spring retains the tank cap in the retracted position or in the standing position. In another example disclosed in JP 2015-226980 A, a conical pressure spring is attached instead, and the resilience of the pressure spring retains the tank cap in the retracted position or in the standing position.

In the structure of the tank cap disclosed in JP 2015-226980 A, retracting the finger grip portion requires the operator to pivotally push the push portion about the pivot shaft. This may limit the finger position for such pushing action. Furthermore, such a spring that can be disposed within the tank cap is supposed to have only a low resilience. This allows the operator to easily cause the finger grip portion to pivot, but this, in turn, means that the retracted position is retained with only a small force, and the finger grip portion may have a potential risk of moving from the retracted position to the standing position contrary to the intention of the operator. A conceivable measure to address this is to increase the resilience by replacing the spring with a thicker one, for example. However, in the structure disclosed in JP 2015-226980 A, only a small installation space is available for the spring, and thus, it is difficult to replace the spring with a thicker one.

When the grip portion accidentally moves from the retracted position to the standing position while the operator works with the chainsaw, the working efficiency decreases as described above. In addition, in this case, the pivot mechanism for allowing the pivoting of the grip portion may break. When the grip portion breaks while the tank cap is tightly attached to the filler port, it may be difficult to detach the tank cap.

In addition, in the tank cap disclosed in JP 2015-226980 A, the pivot mechanism is exposed when the finger grip portion is in the standing position. Thus, foreign matter easily enters the pivot mechanism of the tank cap when it is in the standing position. The entry of foreign matter may not only cause malfunction of the pivot mechanism but may also damage the grip portion.

Furthermore, the tank cap disclosed in JP 2015-226980 A requires the operation for attaching the pivot shaft to be carried out under the condition in which the resilience acts on the grip portion. As such, improvement in ability to assemble this tank cap is required.

The present invention has been made to solve the above problems, and an object of the present invention is to provide a tank cap that is easy to attach and detach, having a lever member and a slide member which become flush with each other when the lever member is in the retracted position, and having favorable operability in moving the lever member between the retracted position and the standing position.

SUMMARY OF THE INVENTION

In order to achieve the above object, a tank cap according to the present invention comprises a cylindrical cap body that is attachable and detachable to a filler port of a tank by being turned about a central axis of the cap body, a lever member disposed in the cap body, the lever member having a retracted position in which the lever member has pivoted down about a pivot shaft and partially closes an opening of the cap body and a standing position in which the lever member stands up, a slide member disposed in the cap body so as to be adjacent to the lever member, and provided with a cam contact portion that is to come into contact with a cam portion of the lever member, and a resilient member disposed between the slide member and a bottom of the cap body, wherein a resilience of the resilient member causes the cam contact portion to press the cam portion and retains the retracted position.

Other objects and features of aspects of the present invention will be understood from the following description with reference to the accompanying drawings.

DESCRIPTION OF PREFERRED EMBODIMENT

Figure 1:
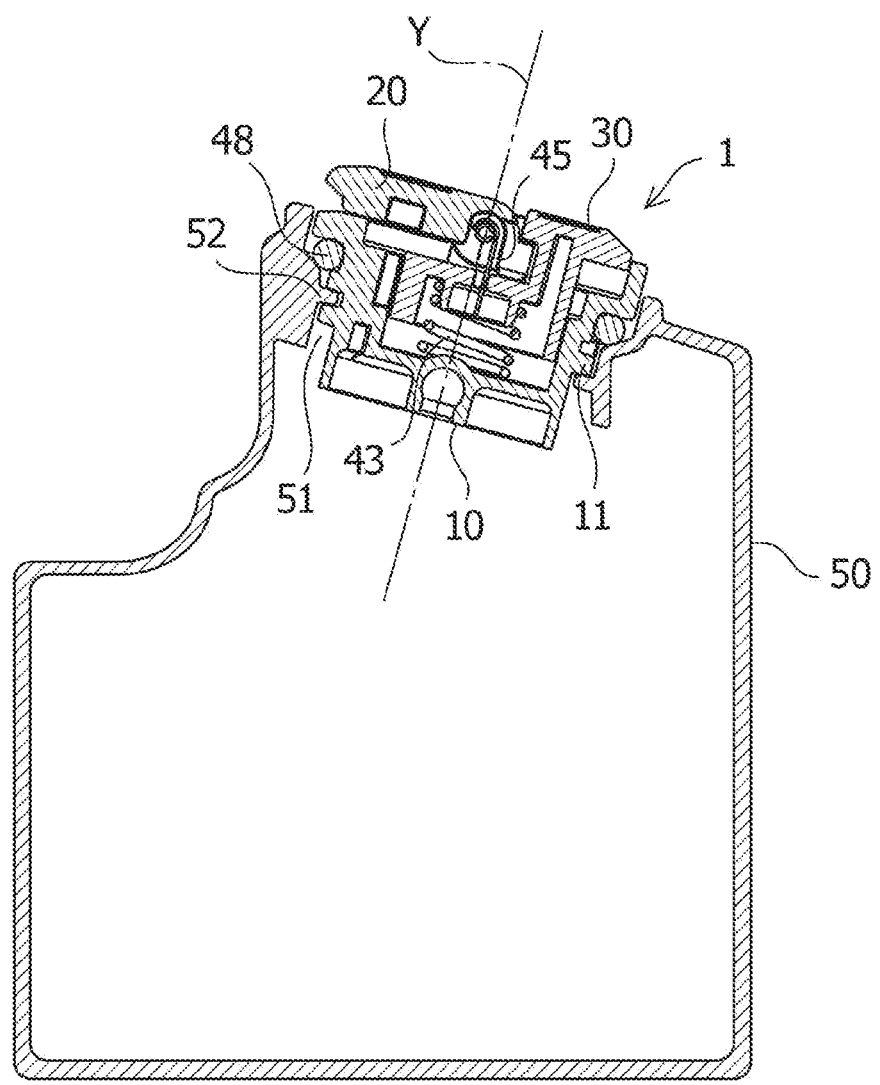
FIG. 1 is a cross-sectional view of a tank to which the tank cap according to the present invention is attached.

Below, an embodiment of a tank cap 1 according to the present invention will be described with reference to the drawings.

The tank cap 1 of this embodiment is attached to a tank 50 having a filler port 51. The tank 50 is mounted on a hand-held tool, such as a chainsaw, driven by an internal combustion engine. The filler port 51 of the tank 50 is circular and has an internal thread 52 in its inner periphery.

The tank cap 1 of this embodiment is formed in an overall stepped cylindrical shape. The tank cap 1 has a cap body 10, a lever member 20, a slide member 30, a coil spring 43 (resilient member), and a torsion coil spring 45 (biasing member). First, the structure of the cap body 10 will be described. As shown in FIGS. 4 to 7, the external shape of the cap body 10 is substantially cylindrical. The cap body 10 has an external thread 11, an opening 13, bearing portions 14, a lever receiving portion 15, a side wall portion 16, and a slide receiving portion 17.

The external thread 11 is provided in the outer peripheral surface of the cap body 10. When the tank cap 1 is turned about its central axis Y, the external thread 11 is screwed and fastened into the internal thread 52 of the filler port 51, so that the tank cap 1 is inserted into the filler port 51 and sealed with an O-ring 48. The opening 13 is substantially circular and provided at the upper end of the cap body 10. The cap body 10 has a recess extending from the opening 13 to a bottom 13c and having a predetermined depth.

The interior of the cap body 10 has a cylindrical receiving surface 13a having a predetermined curvature and a flat receiving surface 13b bulging radially inward from the cylindrical receiving surface 13a. A groove 13d extending in the vertical direction (axial direction) is formed in the flat receiving surface 13b. The slide member 30 and lever member 20 are disposed in the cap body 10. A cylindrical sliding surface 32a and a flat sliding surface 32b of the slide member 30, which will be described later, slide on the cylindrical receiving surface 13a and flat receiving surface 13b, respectively. Although the interior of the cap body 10 of this embodiment has the cylindrical receiving surface 13a and flat receiving surface 13b, the present invention is not limited to this. For example, the interior of the tank cap 1 may be defined by a plurality of flat surfaces extending in the axial direction so that the transverse cross section of the interior may be rectangular.

Figure 2:
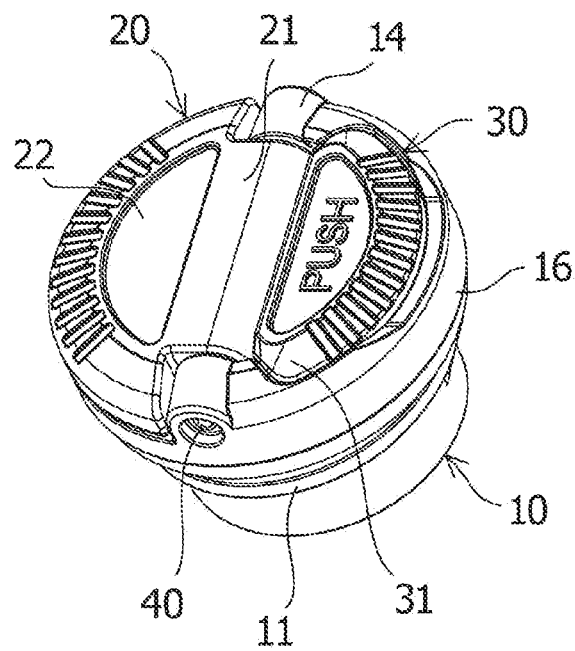
FIG. 2 is a separated perspective view of the tank cap shown in FIG. 1.
Figure 4:
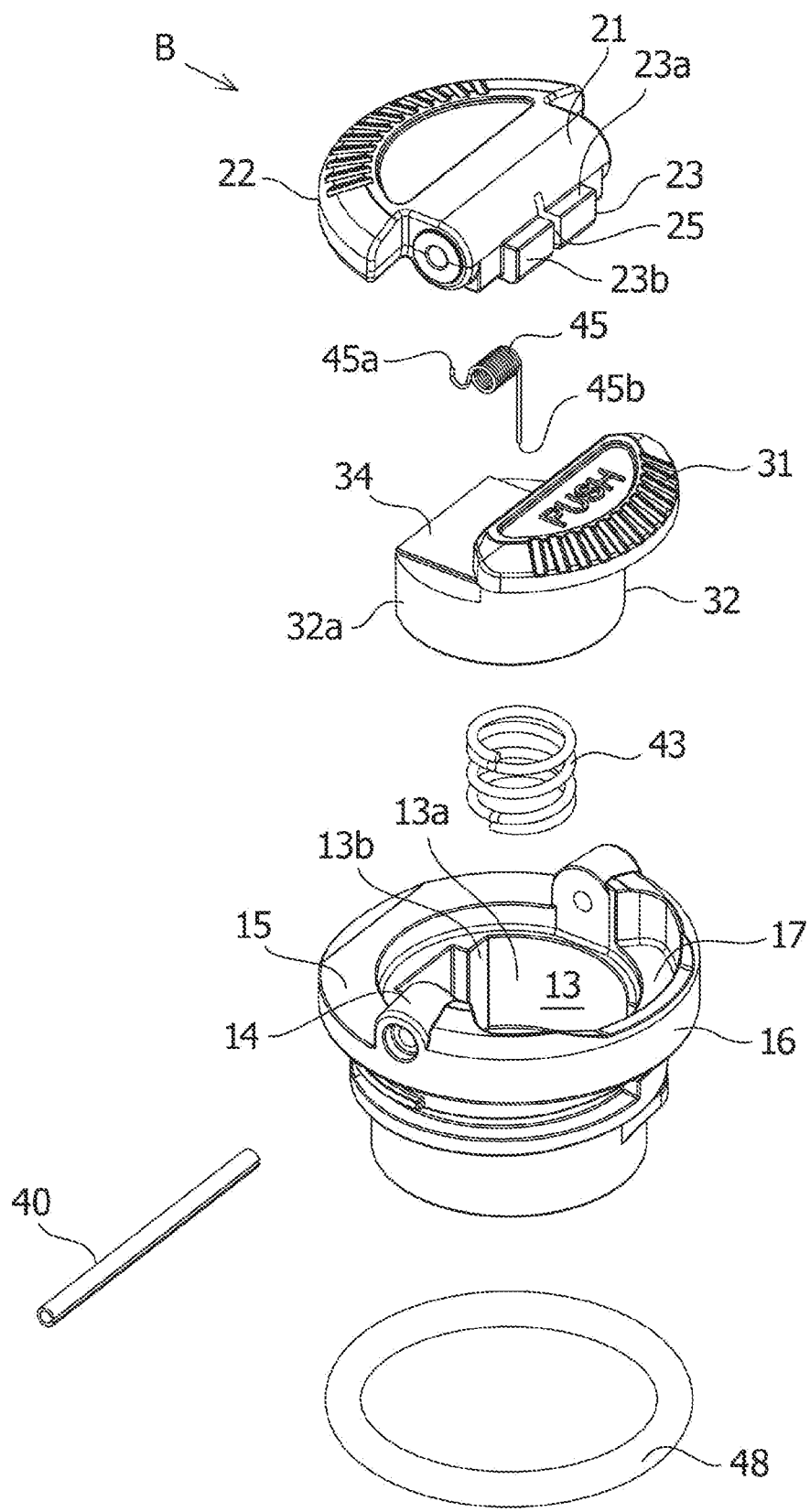
FIG. 4 is an exploded perspective view of the tank cap shown in FIG. 2.
Figure 6:
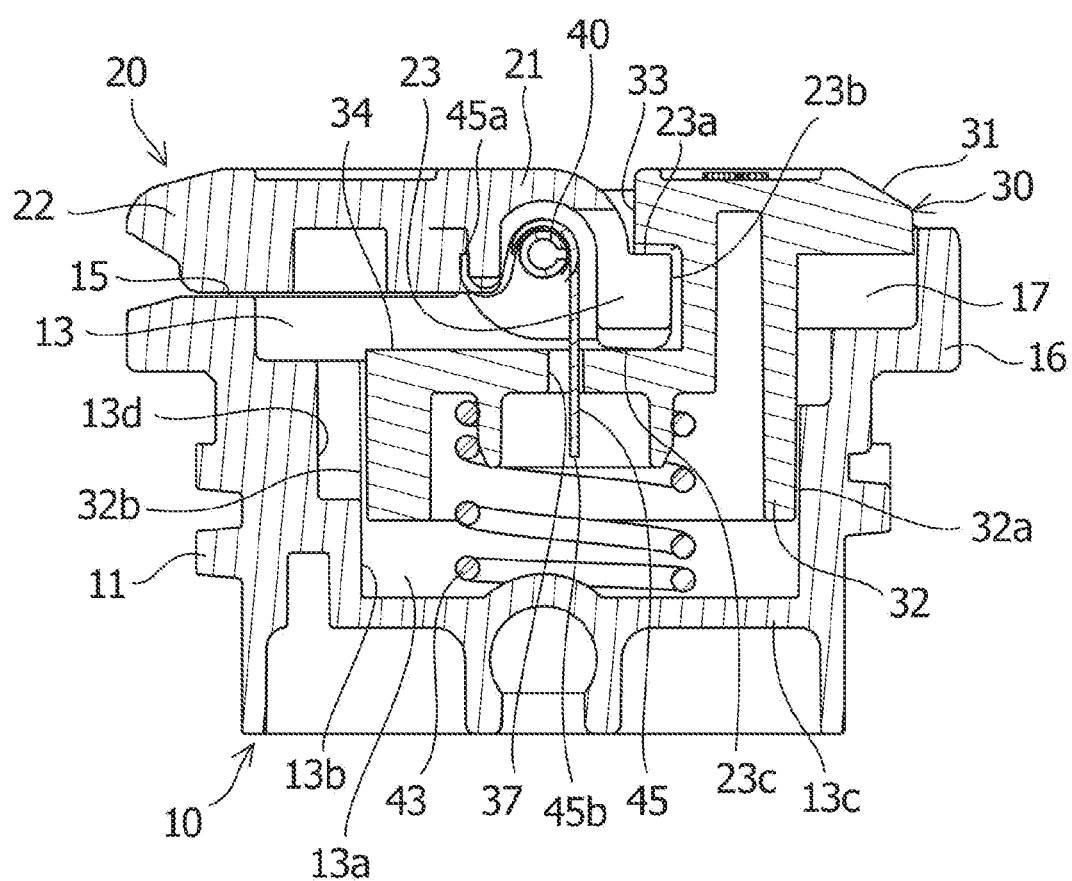
FIG. 6 is an enlarged sectional view of the tank cap shown in FIG. 1.

As shown in FIGS. 2, 4, and 6, in the cap body 10, two bearing portions 14 are provided on the rim of the opening 13 so as to be circumferentially spaced apart from each other. These bearing portions 14 are disposed so as to face each other across the center of the opening 13.

The bearing portions 14 support a pivot shaft 40. The pivot shaft 40 is press-fitted and fixed to the bearing portions 14 and extends perpendicularly to the central axis Y so as to traverse the opening 13. In this example, the pivot shaft 40 is made of a metal hollow cylinder and extends substantially parallel to the diameter of the cylindrical cap body 10.

Figure 3:
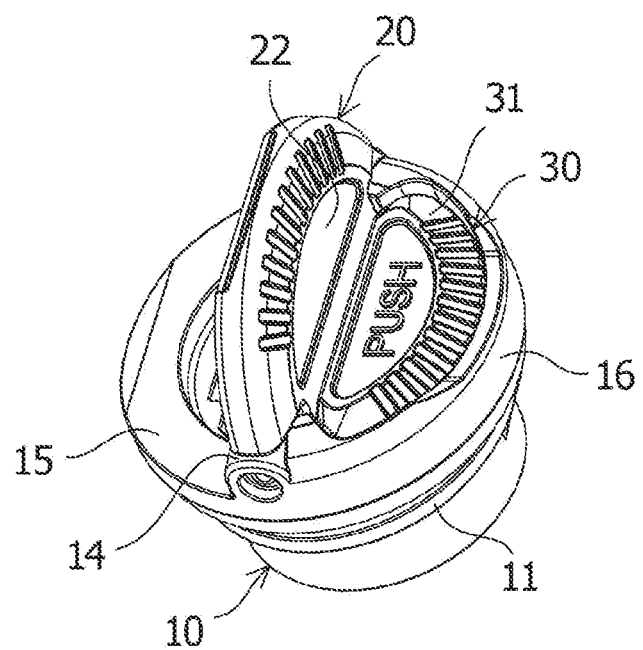
FIG. 3 is a perspective view of the tank cap shown in FIG. 2 in which the lever member is in the standing position.
Figure 5:
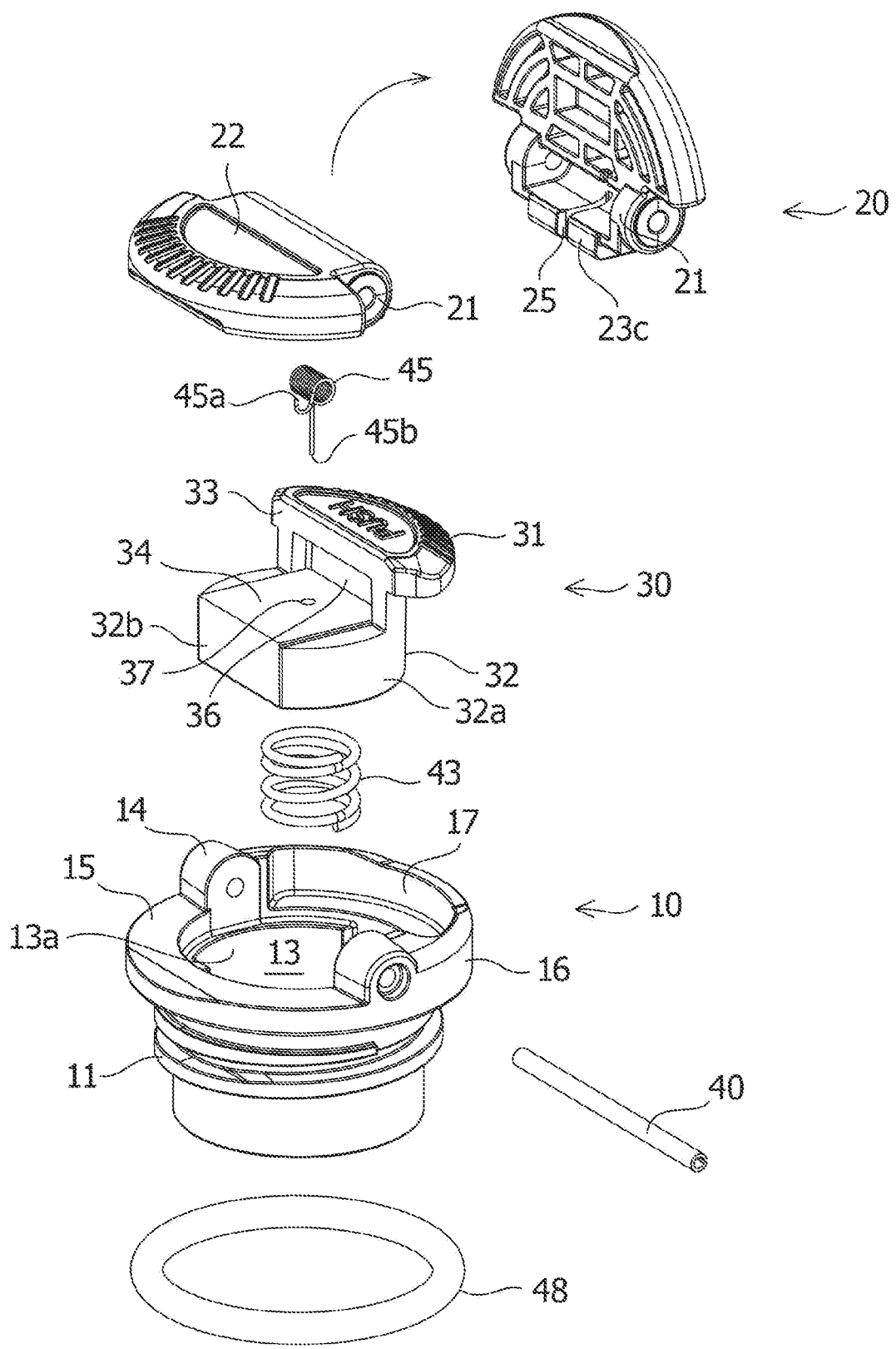
FIG. 5 is an exploded perspective view of the tank cap as viewed in the direction of arrow B of FIG. 4, showing both the lever member in the retracted position and the lever member in the standing position.

As shown in FIGS. 3 to 5, the lever receiving portion 15 is a flat portion formed on the rim of the opening 13. The lever receiving portion 15 has a substantially semicircular annular sector surface. The bearing portions 14 are disposed at the opposite circumferential ends of the lever receiving portion 15.

As shown in FIGS. 4 to 6, the side wall portion 16 is disposed on the opposite side of the lever receiving portion 15 so as to protrude upward from the rim of the opening 13. The side wall portion 16 extends along the outer periphery of the opening 13 over approximately a half circumference. The slide receiving portion 17, which is provided inside the side wall portion 16, receives a push portion 31 of the slide member 30.

As shown in FIGS. 4 and 5, the lever member 20, which is disposed in the cap body 10, has a shaft hole portion 21, a finger grip portion 22, and a cam portion 23 which are integrally formed with each other. The finger grip portion 22 has a substantially semicircular plate shape, and one surface thereof constitutes the outermost surface of the tank cap 1. As shown in FIGS. 4 and 5, the shaft hole portion 21 is provided on the linearly extending section of the finger grip portion 22. Openings are formed at the opposite ends of the shaft hole portion 21, and the pivot shaft 40 is rotatably inserted therethrough into the shaft hole portion 21.

Figure 7:
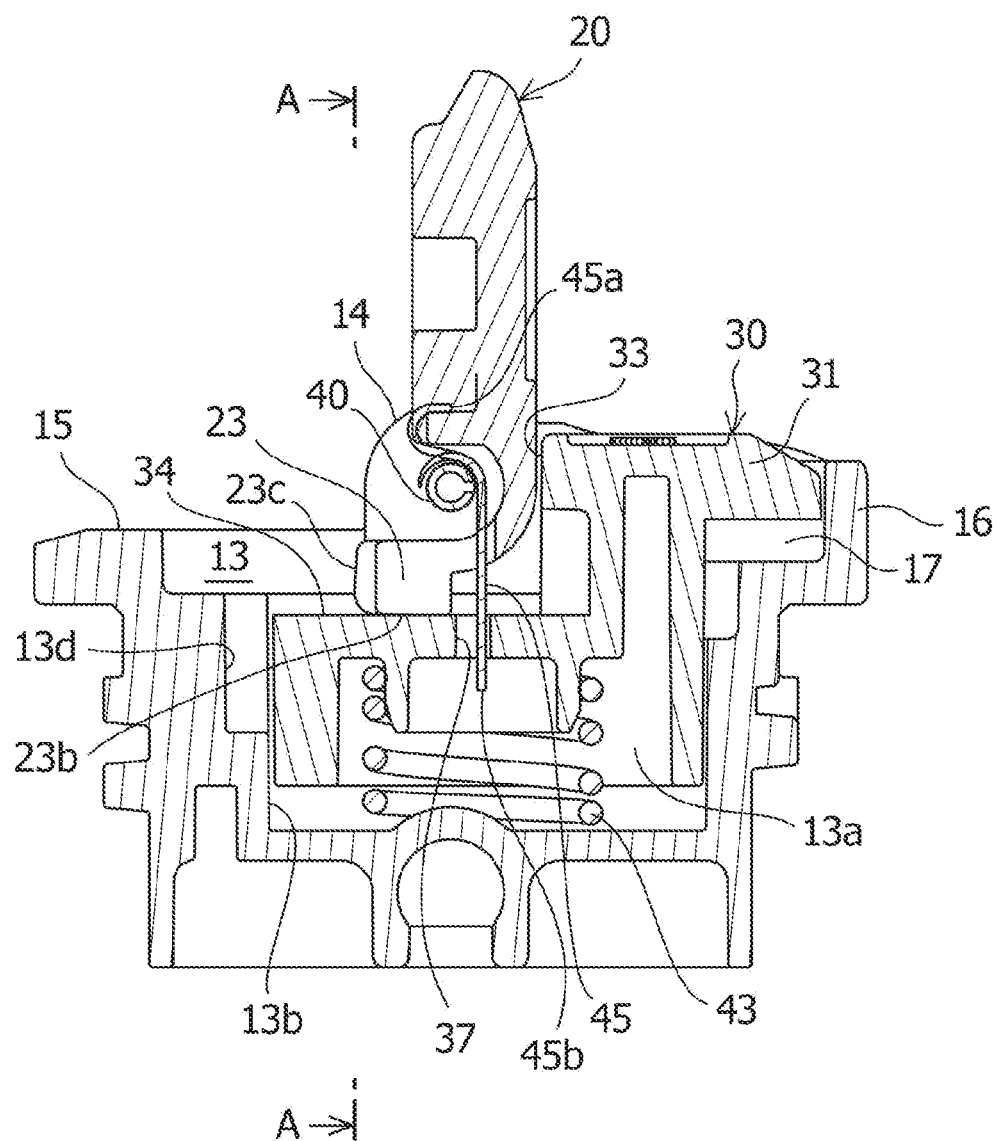
FIG. 7 is a cross-sectional view of the tank cap shown in FIG. 6 in which the lever member is in the standing position.

As shown in FIGS. 6 and 7, the finger grip portion 22 is pivotable about the pivot shaft 40. Specifically, as shown in FIGS. 2 and 3, the lever member 20 has a retracted position in which the finger grip portion 22 closes a part of the opening 13 and a standing position in which the finger grip portion 22 stands up in the axial direction. The operator can grasp the finger grip portion 22 when it is in the standing position. If the operator desires to pull up the lever member 20 to move the lever member 20 to the standing position, the operator can do it by inserting a finger into a gap between the tip of the finger grip portion 22 and the lever receiving portion 15.

As shown in FIGS. 4 to 6, the cam portion 23, which has a substantially rectangular parallelepiped shape, is integrally provided on a side of the shaft hole portion 21. The cam portion 23 protrudes away from the finger grip portion 22 and extends in the longitudinal direction of the pivot shaft 40. Note that the shape of the cam portion 23 is not limited to a rectangular parallelepiped, and may be, for example, a semicylinder.

As shown in FIGS. 4 to 6, the cam portion 23 in this embodiment has a first surface 23*a* that is not to come into contact with a cam contact portion 34 of the slide member 30, and a second surface 23*b* and a third surface 23*c*, which are two surfaces that are to come into contact with the cam contact portion 34. When the lever member 20 is in the retracted position, the first surface 23*a* of the cam portion 23 becomes an upper surface, the second surface 23*b* becomes a side surface orthogonal to the first surface 23*a*, and the third surface 23*c* becomes a lower surface parallel to the first surface 23*a* and orthogonal to the second surface 23*b*.

Figure 8:
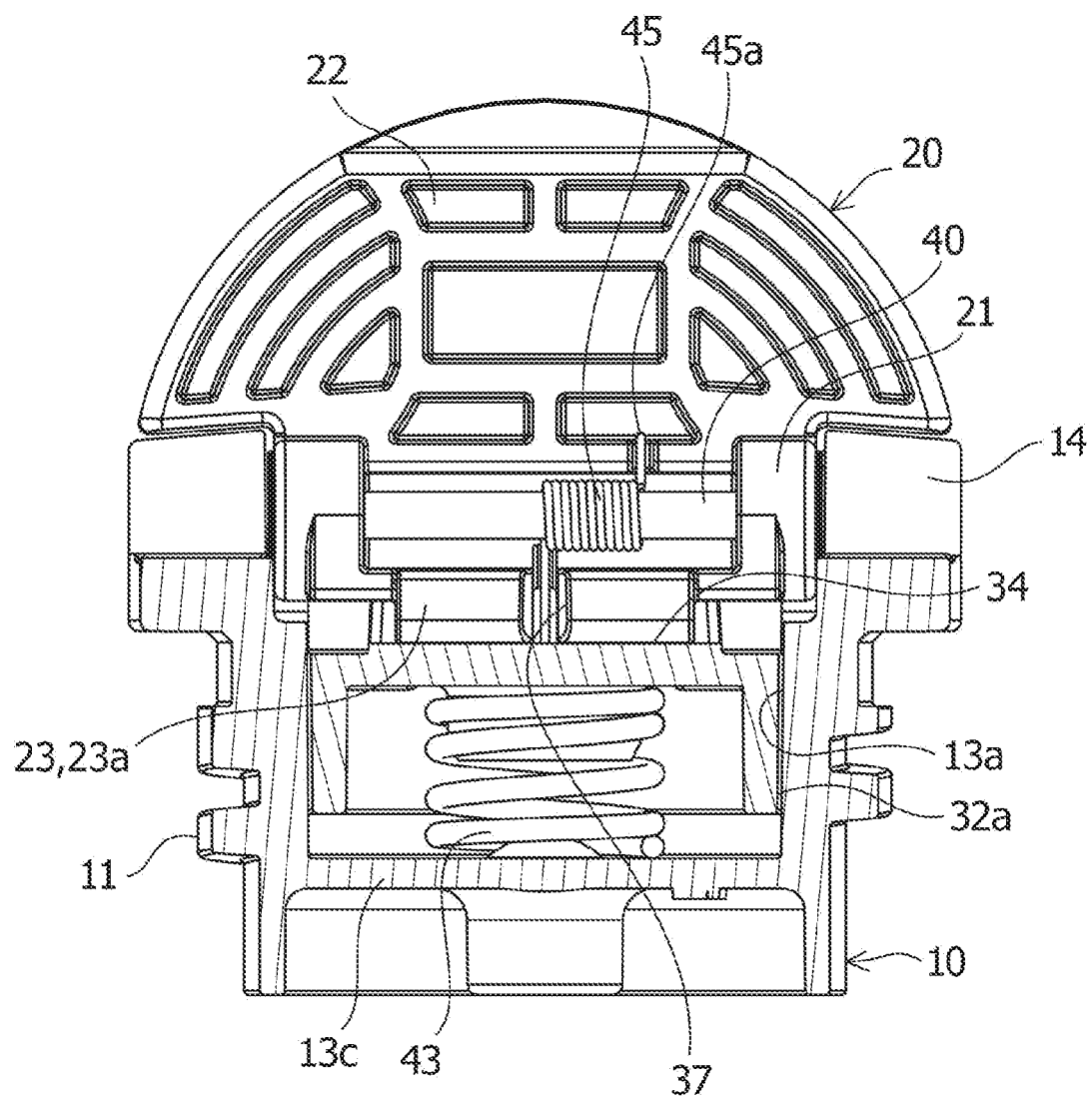
FIG. 8 is a cross-sectional view of the tank cap taken along line indicated by arrows A as viewed in the direction indicated by arrows A of FIG. 7.

As shown in FIGS. 4, 5 and 8, a notch 25 is provided at the longitudinal center of the cam portion 23. The notch 25 extends from the second surface 23*b* to the shaft hole portion 21 so as to traverse the first surface 23*a* perpendicularly to the pivot shaft 40. In addition, in the vertical side wall of the shaft hole portion 21, the notch 25 also extends upward from the first surface 23*a*. The torsion coil spring 45 is inserted through the notch 25.

Next, the slide member 30 will be described. The slide member 30 is disposed in the cap body 10 so as to be adjacent to the lever member 20. The slide member 30 has a sliding portion 32, the push portion 31, a vertical wall portion 33, and the cam contact portion 34 which are integrally formed with each other. The slide member 30 may reciprocate along the inner surface of the cap body 10 in the vertical direction (axial direction of the central axis Y).

The sliding portion 32 extends in the vertical direction as a whole and, as shown in FIGS. 4 to 6, slides on the cylindrical receiving surface 13*a* and flat receiving surface 13*b* of the cap body 10. The sliding portion 32 has the cylindrical sliding surface 32*a* for sliding on the cylindrical receiving surface 13*a* and the flat sliding surface 32*b* for sliding on the flat receiving surface 13*b*. The cylindrical sliding surface 32*a* has a curvature corresponding to that of the cylindrical receiving surface 13*a* of the cap body 10. A part of the sliding portion 32 extends to the push portion 31, and the remaining part of the sliding portion 32 extends to the cam contact portion 34, which will be described later. The flat sliding surface 32*b*, which extends in the vertical direction (axial direction of the central axis Y), is formed to be flat by cutting out part of the cylindrical sliding surface 32*a*.

Sliding the sliding portion 32 on the flat receiving surface 13*b* allows the slide member 30 to slide reciprocally in the vertical direction (axial direction of the central axis Y) without rotating. In the sliding portion 32 of this embodiment, the cylindrical sliding surface 32*a* has a shape corresponding to the cylindrical receiving surface 13*a* and the flat sliding surface 32*b* have a shape corresponding to the flat receiving surface 13*b*. However, the present invention is not limited to this. The sliding portion 32 may be configured to slide in partial contact with the cylindrical receiving surface 13*a* and flat receiving surface 13*b*.

As shown in FIGS. 4 to 7, the push portion 31 is provided in an upper portion of the slide member 30. Specifically, the push portion 31 is integrally provided on the upper end of the cylindrical sliding surface 32*a*, and extends perpendicular to the cylindrical sliding surface 32*a*. The push portion 31 is substantially semicircular, and when the lever member 20 is in the retracted position, the finger grip portion 22 is flush with the push portion 31.

As shown in FIGS. 5 to 7, the vertical wall portion 33 faces the finger grip portion 22, and extends in the axial direction and in parallel to the pivot shaft 40. The lower end of the vertical wall portion 33 is connected to the flat cam contact portion 34, which extends perpendicular to the axial direction. The lever member 20 is disposed on the cam contact portion 34.

As shown in FIG. 5, the vertical wall portion 33 has a cam receiving section 36, which is a recess for receiving the cam portion 23 of the lever member 20. The cam receiving section 36 is a substantially rectangular parallelepiped space (recess) recessed perpendicularly to the vertical direction (recessed perpendicularly to the axial direction of the central axis Y). The cam receiving section 36 extends in the longitudinal direction of the pivot shaft 40, and the cam portion 23 can be inserted into the cam receiving section 36 when the lever member 20 is in the retracted position. When the lever member 20 is in the retracted position, the upper surface of the cam receiving section 36 faces the first surface 23*a* of the cam portion 23 and the back side inner surface of the cam receiving section 36 faces the second surface 23*b*. The lower surface of the cam receiving section 36 continues the cam contacting portion 34 so as to be flush therewith, and faces the third surface 23*c* when the lever member 20 is in the retracted position.

Although the vertical wall portion 33 of this embodiment has the cam receiving section 36, the present invention is not limited thereto. For example, a protrusion may be provided to the vertical wall portion 33 and may receive the cam portion 23.

A through hole 37 is formed in the cam contact portion 34. The through hole 37 is formed at a position corresponding to the notch 25 so as to communicate with the notch 25 in the vertical direction (axial direction of the central axis Y). The torsion coil spring 45 is inserted through the through hole 37.

As shown in FIGS. 6 to 8, the coil spring 43 is disposed between the bottom 13*c* of the cap body 10 and the slide member 30. The upper end of the coil spring 43 presses the bottom of the slide member 30 upward. The resilience of the coil spring 43 maintains the contact between the cam portion 23 and the cam contact portion 34. The relationship between the coil spring 43 and the contact between the cam portion 23 and the cam contact portion 34 will be described later.

As shown in FIGS. 6 to 8, the torsion coil spring 45 is wound around the pivot shaft 40. One end (upper end 45*a*) of the torsion coil spring 45 extends toward the finger grip portion 22, and is connected to the back surface of the finger grip portion 22. The other end (lower end 45*b*) of the torsion coil spring 45 passes through the notch 25 and through hole 37. In this example, the lower end 45*b* is a free end.

The torsion coil spring 45 biases the finger grip portion 22 to pivot about the pivot shaft 40 in the direction from the retracted position to the standing position. The elastic coefficient of the torsion coil spring 45 is smaller than that of the coil spring 43.

Next, the procedure to attach or detach the tank cap 1 in this embodiment will be described. As shown in FIG. 2, the lever member 20 is retained in the retracted position except when the tank cap 1 is attached or detached. When detaching the tank cap 1 that has attached to the filler port 51, the operator first moves the lever member 20 of the tank cap 1 to the standing position as shown in FIG. 3.

After that, the operator grasps the finger grip portion 22, and turns the tank cap 1 about the center axis Y, thus unscrewing the threads 11, 52 and detaching the tank cap 1 from the filler port 51.

When attaching the tank cap 1, the operator first moves the lever member 20 to the standing position, then grips the finger grip portion 22, and turns the tank cap 1 so as to screw the external thread 11 of the tank cap 1 into the internal thread 52 of the filler port 51. As a result, the thread 11 of the tank cap 1 is screwed into the thread 52 of the filler port 51, and the tank cap 1 is attached to the filler port 51 and sealed to ensure that the liquid in the tank 50 will not leak out.

Here, the tank cap 1 retained in the retracted position will be described. In the retracted position, the finger grip portion 22 is pushed over sideways, and the cam portion 23 is inserted into the cam receiving section 36 of the vertical wall portion 33. At that time, the upper end of the coil spring 43 presses the bottom of the slide member 30 with the resilience of the coil spring 43, and causes the cam contact portion 34 to press the third surface 23c of the cam portion 23 in the retracted position. In the retracted position, being pressed upward by the resilience of the coil spring 43, the bottom of the slide member 30 is kept spaced upward from the bottom 13c of the cap body 10. Furthermore, as shown in FIG. 6, the lower surface of the push portion 31 is maintained in an upper part of the slide receiving portion 17, being spaced apart from the cap body 10.

In addition, the cam contact portion 34 presses the third surface 23c of the cam portion 23, and this produces a rotational force that causes the finger grip portion 22, which is positioned on the opposite side of the cam portion 23 across the pivot shaft 40, to pivot about the pivot shaft 40 from the standing position to the retracted position. As a result, the lever member 20 is in close contact with the lever receiving portion 15 of the cap body 10. In this way, the lever member 20 is retained in the retracted position, and the finger grip portion 22 is constrained from moving from the retracted position to the standing position contrary to the intention of the operator.

Furthermore, as shown in FIGS. 2 and 6, in the retracted position, the head, which is constituted by the lever member 20 and slide member 30, of the tank cap 1 is maintained flat with no protrusion. Thus, when the operator uses a handheld tool, such as a chainsaw, on which the tank 50 having the tank cap 1 of this embodiment is mounted, the finger grip portion 22 does not protrude, and the head of the tank cap 1 is prevented from catching on the operator's work clothes or the like. Furthermore, since the finger grip portion 22 does not protrude, the finger grip portion 22 can be prevented from impacting another structure and breaking. In other words, the safety performance of the work using the handheld tool is enhanced.

In addition, having the flat head, the tank cap 1 has better external (more aesthetic) appearance. Furthermore, in the retracted position, the lever receiving portion 15 of the cap body 10 and the back surface of the finger grip portion 22 are brought in close contact with each other by the resilience of the coil spring 43. This prevents or reduces the entry of foreign matter such as dust from the opening 13 of the cap body 10.

Next, the operation from the retracted position to the standing position will be described. When the lever member 20 is in the retracted position, the operator pushes the push portion 31 downward in the axial direction of the central axis Y of the tank cap 1. Thereby, the operator applies a downward force against the resilience of the coil spring 43.

In response, the slide member 30 slides downward in the cap body 10. Specifically, as described above, the cylindrical sliding surface 32a and flat sliding surface 32b of the slide member 30 slide on the cylindrical receiving surface 13a and flat receiving surface 13b, respectively. In addition, the side surface of the push portion 31 slides in the slide receiving portion 17 inside the side wall portion 16. As a result, the pressing from the cam contacting portion 34 to the third surface 23c of the cam portion 23 is released and a space is generated therebetween and permits the pivotal movement of the cam portion 23.

As shown in FIGS. 6 and 7, as the pivotal movement of the cam portion 23 is permitted, the finger grip portion 22, which is integrally formed with the shaft hole portion 21 and cam portion 23, is also permitted to pivot about the pivot shaft 40. Furthermore, when the pivotal movement of the finger grip portion 22 and cam portion 23 is permitted, the corner portion defined by the second and third surfaces 23b, 23c of the cam portion 23 is permitted to slide on the cam contact portion 34.

The cam contacting portion 34 is preferably formed as a flat surface. This allows the cam portion 23 to pivot to smoothly follow the sliding movement of the slide member 30, and facilitates a smooth transition of the finger grip portion 22 to the standing position or to the retracted position. In addition, such a flat cam contacting portion 34 effectively works with the coil spring 43 to retain the cam portion 23 in the retracted position or in the standing position.

When the pivotal movement of the finger grip portion 22 and cam portion 23 is permitted, the resilience of the torsion coil spring 45 causes the finger grip portion 22 and cam portion 23 to pivot about the pivot shaft 40. As a result, the finger grip portion 22 can move from the retracted position to the standing position. If the tank cap 1 does not include the torsion coil spring 45, the operator can also move the finger grip portion 22 from the retracted position to the standing position by pulling up the finger grip portion 22 about the pivot shaft 40.

Figure 11A:
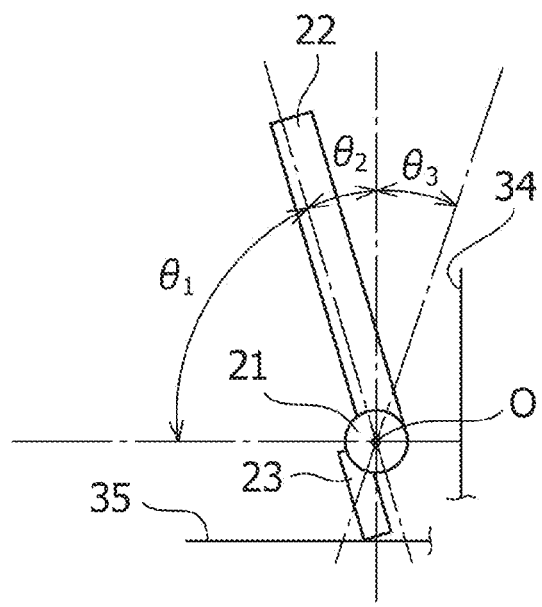
FIG. 11A is a schematic side view for schematically illustrating the state in which the finger grip portion lies at a boundary position (dead point) between a positional range within which the finger grip portion is driven to move back to the retracted position and a positional range within which the finger grip portion is driven to move to the standing position.

FIG. 11A schematically shows the finger grip portion 22 being at a boundary position (dead point) between a positional range within which the finger grip portion 22 is driven to move back to the retracted position and a positional range within which the finger grip portion 22 is driven to move to the standing position. In this embodiment, $\theta_1 > \theta_2$ holds at the boundary position, where $\theta_1$ represents an angle between the horizontal line and the finger grip portion 22, and $\theta_2$ represents an angle between the vertical line and the finger grip portion 22. In this example, at the boundary position, $\theta_1$ is greater than 45° and less than 90°. For example, when the finger grip portion 22 is brought up such that $\theta_1$ becomes an angle between 70° and 80°, the finger grip portion 22 is driven to move to the standing position.

Figure 11B:
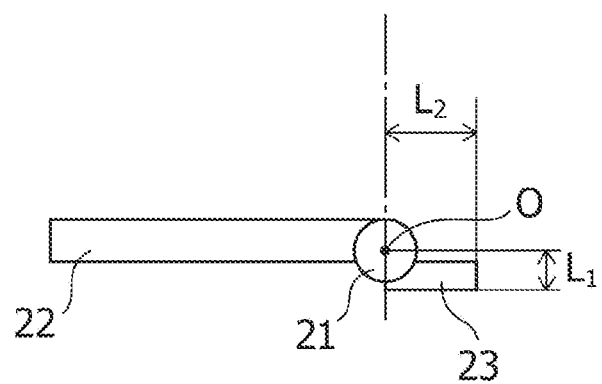
FIG. 11B is a schematic side view of the finger grip portion in the retracted position.
Figure 12:
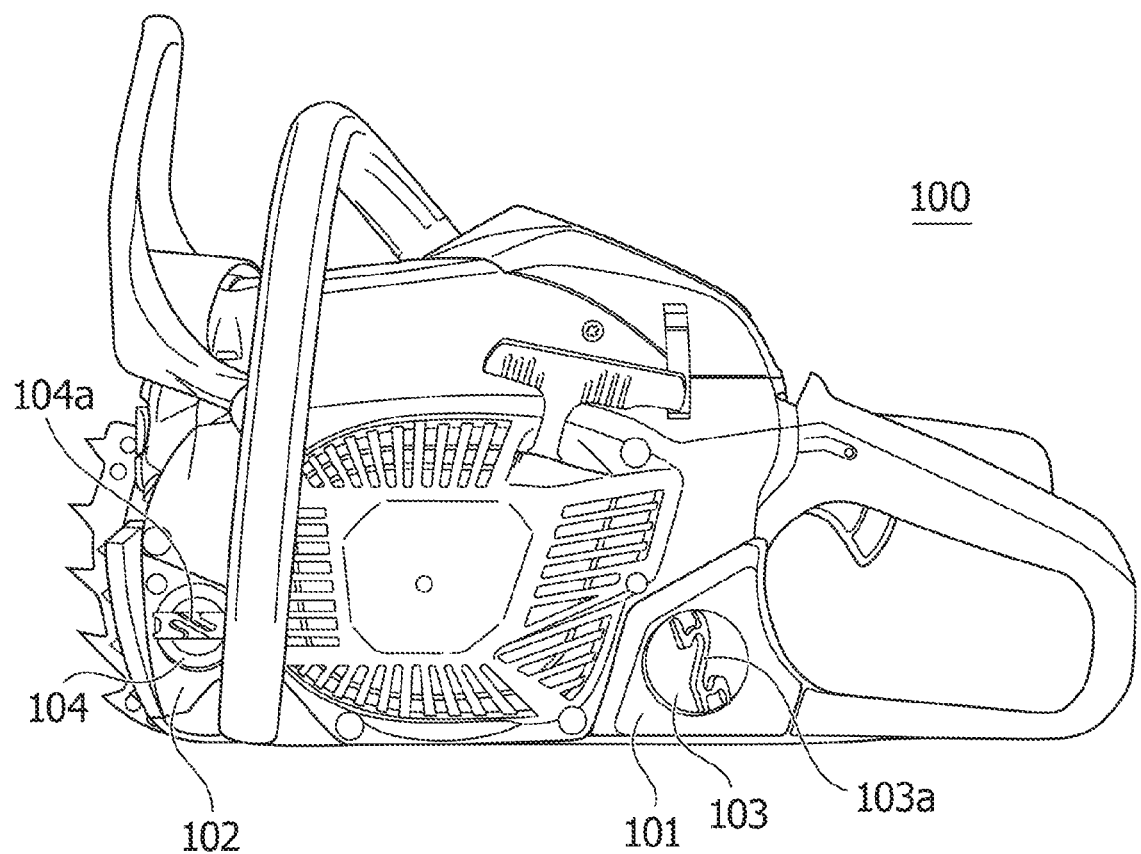
FIG. 12 is an external view of a conventional chainsaw.

FIG. 11B schematically shows the finger grip portion 22, the shaft hole portion 21, and the cam portion 23. In this example, $L_1 < L_2$ holds, where $L_1$ represents a distance between the pivot point O and the lower end of the cam portion 23, and $L_2$ represents a distance between the pivot point O and the distal end of the cam portion 23. When the above relationships between $\theta_1$ and $\theta_2$ and between $L_1$ and $L_2$ are satisfied, the lever member 20 is unlikely to stand up, that is, the lever member 20 is constrained from standing up contrary to the intention of the operator.

After the corner portion defined by the second and third surfaces 23b, 23c slides on the cam contact portion 34, the second surface 23b comes into contact with the cam contact portion 34. At that time, the resilience of the torsion coil spring 45 bring the second surface 23b into moderate contact with the cam contact portion 34, and the finger grip portion 22 is in the standing position. Such a moderate contact while the finger grip portion 22 is in the standing position allows for the crisp movement of the finger grip portion 22, and improves usability for the operator. Furthermore, when the second surface 23b is in contact with the cam contact portion 34, the slide member 30 is pushed upward by the resilience of the coil spring 43. In this embodiment, the operator can move the finger grip portion 22 to the standing position by simply pushing the push portion 31.

When the finger grip portion 22 stands up in the vertical direction (axial direction of the central axis Y), the second surface 23b of the cam portion 23 is in contact with the cam contact portion 34 and the resilience of the coil spring 43 retains the finger grip portion 22 in the standing position. In addition, the torsion coil spring 45 applies a rotational force to the finger grip portion 22 such that the finger grip portion 22 pivots about the pivot shaft 40 in the direction from the retracted position to the standing position. This rotational force also causes the side surface of the shaft hole portion 21 to press the slide member 30. Thus, the lever member 20 is reliably retained in the standing position, and the attaching and detaching of the tank cap 1 may be further facilitated.

Next, the operation from the standing position to the retracted position will be described. To move the finger grip portion 22 from the standing position to the retracted position, the operator pushes the standing finger grip portion 22 in the direction toward the retracted position. This makes the retaining force of the torsion coil spring 45 less effective and makes the upward pressing of the coil spring 43 more effective. As a result, the finger grip portion 22 is pushed over sideways to the retracted position, and retained in this retracted position.

Since the elastic coefficient of the coil spring 43 is greater than that of the torsion coil spring 45, when the finger grip portion 22 is caused to pivot from the standing position until it is tilted sideways to some extent, the resilience of the coil spring 43 causes the cam contact portion 34 to push up the corner portion defined by the second and third surfaces 23b, 23c. As a result, the lever member 20 is brought to the retracted position, in which the cam contact portion 34 presses the third surface 23c upward.

In addition, the force (flip-up/flip-down force) acting to move the lever member 20 between the retracted position and the standing position can be easily controlled by adjusting the elastic coefficient of the coil spring 43 and the vertical position of the cam portion 23 in the retracted position. For example, the elastic coefficient of the coil spring 43 may be easily adjusted by replacing the existing coil spring 43 with a thicker spring. Furthermore, since the finger grip portion 22 is formed in a semicircular plate shape so as to maximize its size, the operator can turn the tank cap 1 with less effort. When the operator desires to move the lever member 20 to the standing position, the operator can easily do this regardless of finger position by simply pushing in the slide member 30 in the axial direction of the central axis Y of the tank cap 1. Alternatively or additionally, the operator may also easily move the lever member 20 to the standing position by pulling up the lever member 20 such that it pivots about the pivot shaft 40. Thus, even when the elastic coefficient of the coil spring 43 is increased to adapt to the environment in which the operator works using the hand-held tool, the operator can easily move the lever member 20 to the standing position by pushing in the slide member and pulling up the lever member substantially at the same time.

The lower end 45b of the torsion coil spring 45 passes through the notch 25 and the through hole 37 and disposed as a free end under the slide member 30. The vertical position of the lower end 45b of the torsion coil spring 45 in the retracted position is located below that in the standing position. In other words, the lower end 45b moves downward as the lever member 20 moves from the standing position to the retracted position.

In this embodiment, the lower end 45b is inserted through the notch 25 and the through hole 37 and is disposed in a space provided on the back of (under) the cam contact portion 34. Thus, while the lever member 20 moves from the standing position to the retracted position, the movement of the lower end 45b does not interfere with the movement of the cam portion 23 toward contact with the cam contact portion 34. Furthermore, when the lever member 20 is in the standing position, the lower end 45b is located at a position that is invisible to the operator and the lower end 45b will not catch on the operator's hand or the like. This allows the operator to safely open and close the tank cap 1.

Figure 9:
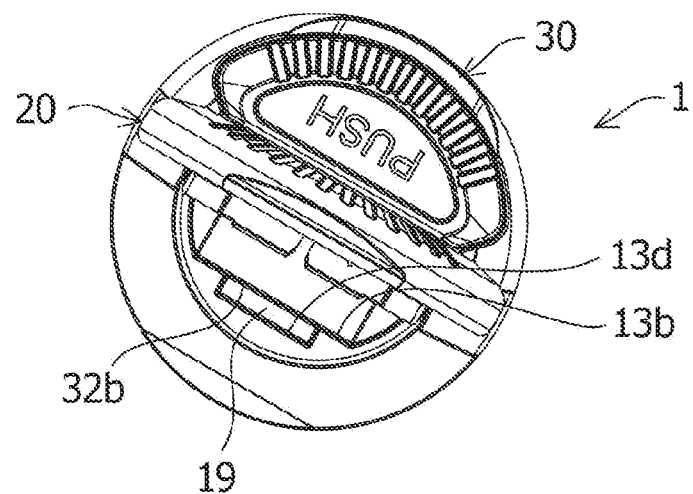
FIG. 9 is a top view of the tank cap shown in FIG. 3.
Figure 10:
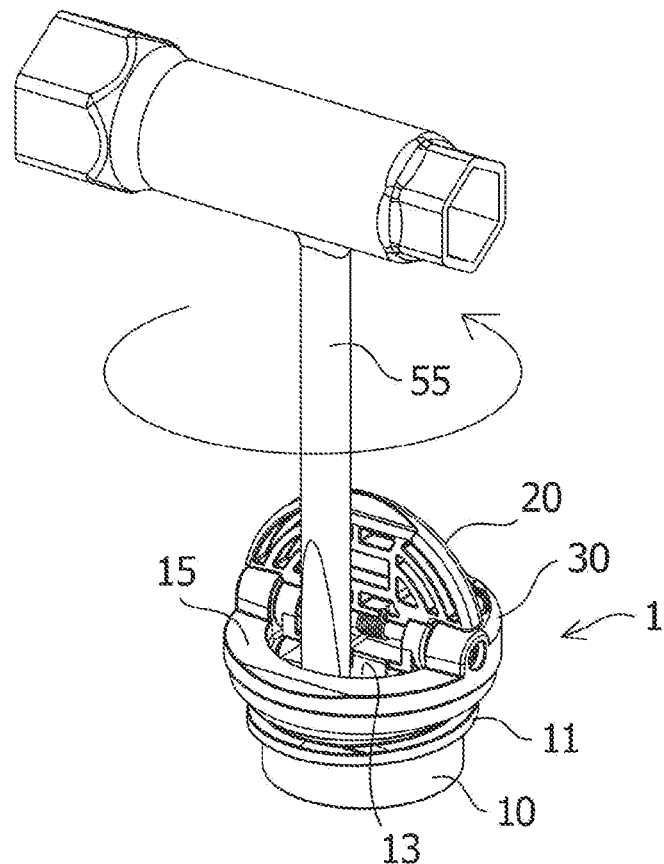
FIG. 10 is a perspective view of the tank cap shown in FIG. 9 when a tool is inserted into the tool insertion hole.

In this embodiment, as shown in FIG. 9, the groove 13d formed in the flat receiving surface 13b of the cap body 10 and the flat sliding surface 32b of the slide member 30 define a tool insertion hole 19, which opens upward. As shown in FIG. 10, a tool 55 such as a slotted screwdriver can be inserted into the tool insertion hole 19. The tool insertion hole 19 helps the operator reliably open and close the tank cap 1 even when the finger grip portion 22 and/or the like have broken.

Furthermore, the tank cap 1 of this embodiment allows the operator to reliably, vertically bring up the finger grip portion 22 by simply pushing the push portion 31 in the axial direction. Thus, even when a hand-held tool such as a chainsaw has a structure in which the tank cap 1 is less accessible to the operator; for example, when the tank cap 1 is attached in a recess or when other components of the chainsaw are arranged around the tank cap 1, the operator can reliably vertically bring up the finger grip portion 22 by accessing and pushing the push portion 31 of the tank cap 1. This allows for a more flexible component layout of the hand-held tool such as a chainsaw.

Also, as shown in FIG. 11A, the lever member 20 has an angular play defined by an angle $\theta_3$ between the vertical line and the finger grip portion 22 that is in contact with the vertical wall portion 33 of the slide member 30. By providing the angular play $\theta_3$, the finger grip portion 22 in the standing position is not perfectly stationary but movable within the angular play $\theta_3$. Thus, the tank cap 1 provides an ability to assemble that is satisfactorily improved, for example.

The embodiment described above is merely an illustrative example of the present invention and not intended to limit the invention defined in the claims. Furthermore, the configuration of each part of the present invention is not limited to those in the above embodiment, and various modifications can be made within the technical scope of the claims.

In the above embodiment, the lever member 20 is moved from the retracted position to the standing position when the operator pushes down the slide member 30, but the present invention is not limited to this. Alternatively, the present invention may be configured to allow the operator to vertically pull up the finger grip portion 22 of the lever member 20 by gripping the arc end portion of the finger grip portion 22.

According to the present invention, provided is a tank cap including a lever member which has a retracted position and a standing position. The lever member has improved operability and is constrained from moving to the standing position contrary to the intention of the operator. In addition, the operator can easily turn the tank cap by grasping the lever member when it is in the standing position.

What is claimed is:

1. A tank cap comprising:
a cylindrical cap body that is attachable and detachable to a filler port of a tank by being turned about a central axis of the cap body;
a lever member disposed in the cap body, the lever member having a retracted position in which the lever member has pivoted down about a pivot shaft and partially closes an opening of the cap body and a standing position in which the lever member stands up;
a slide member disposed in the cap body so as to be adjacent to the lever member, and provided with a cam contact portion that is to come into contact with a cam portion of the lever member; and
a resilient member disposed between the slide member and a bottom of the cap body,
wherein a resilience of the resilient member causes the cam contact portion to press the cam portion and retains the retracted position, and
the lever member is moved from the retracted position to the standing position by
pushing the slide member in an axial direction of the central axis.

2. The tank cap according to claim 1, wherein the pivot shaft is provided with a biasing member for biasing the lever member toward the standing position.

3. The tank cap according to claim 1, wherein the cam contact portion is formed as a flat surface.

4. The tank cap according to claim 2, wherein
a notch is formed in the cam portion,
a through hole is formed in the cam contact portion, and
one end of the biasing member is connected to the lever member, and the other end of the biasing member passes through the notch and the through hole.

5. The tank cap according to claim 2, wherein an elastic coefficient of the resilient member is greater than an elastic coefficient of the biasing member.

6. The tank cap according to claim 1, wherein
the resilient member is a coil spring placed on the bottom, and
the coil spring presses the slide member.

7. The tank cap according to claim 2, wherein the biasing member is a torsion coil spring wound around the pivot shaft.

8. The tank cap according to claim 1, wherein
a groove is formed in an inner surface of the cap body,
the slide member has a sliding surface for sliding on the inner surface, and
the groove and the sliding surface define a tool insertion hole.

9. A tank cap comprising:
a cylindrical cap body that is attachable and detachable to a filler port of a tank by being turned about a central axis of the cap body;
a lever member disposed in the cap body, the lever member having a retracted position in which the lever member has pivoted down about a pivot shaft and partially closes an opening of the cap body and a standing position in which the lever member stands up;
a slide member disposed in the cap body so as to be adjacent to the lever member, and provided with a cam contact portion that is to come into contact with a cam portion of the lever member; and
a resilient member disposed between the slide member and a bottom of the cap body, wherein
a resilience of the resilient member causes the cam contact portion to press the cam portion and retains the retracted position,
the pivot shaft is provided with a biasing member for biasing the lever member toward the standing position,
a notch is formed in the cam portion,
a through hole is formed in the cam contact portion, and
one end of the biasing member is connected to the lever member, and the other end of the biasing member passes through the notch and the through hole.

10. A tank cap comprising:
a cylindrical cap body that is attachable and detachable to a filler port of a tank by being turned about a central axis of the cap body;
a lever member disposed in the cap body, the lever member having a retracted position in which the lever member has pivoted down about a pivot shaft and partially closes an opening of the cap body and a standing position in which the lever member stands up;
a slide member disposed in the cap body so as to be adjacent to the lever member, and provided with a cam contact portion that is to come into contact with a cam portion of the lever member; and
a resilient member disposed between the slide member and a bottom of the cap body, wherein
a resilience of the resilient member causes the cam contact portion to press the cam portion and retains the retracted position,
a groove is formed in an inner surface of the cap body,
the slide member has a sliding surface for sliding on the inner surface, and
the groove and the sliding surface define a tool insertion hole.

* * * * *